July 27, 1926.
A. I. HANSEN
PIPE COUPLING
Filed August 18, 1925
1,594,258
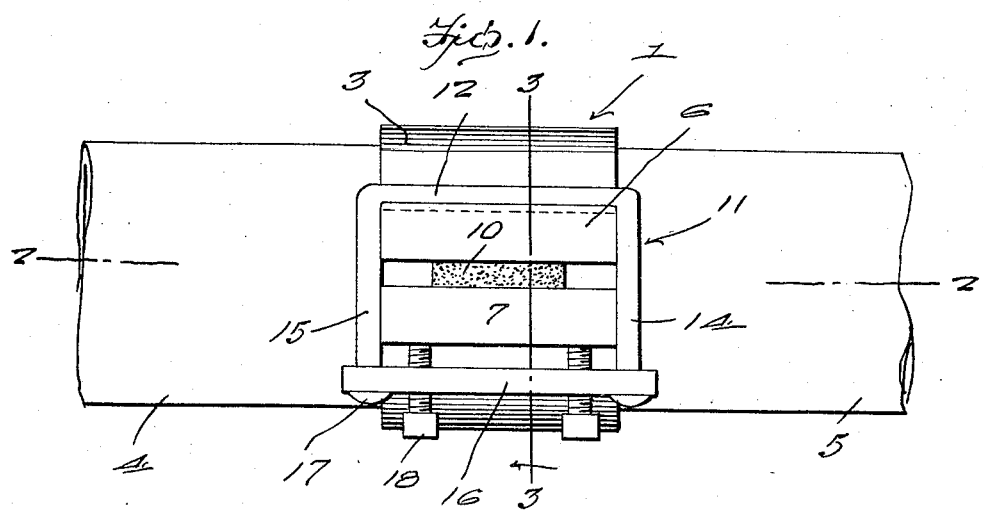
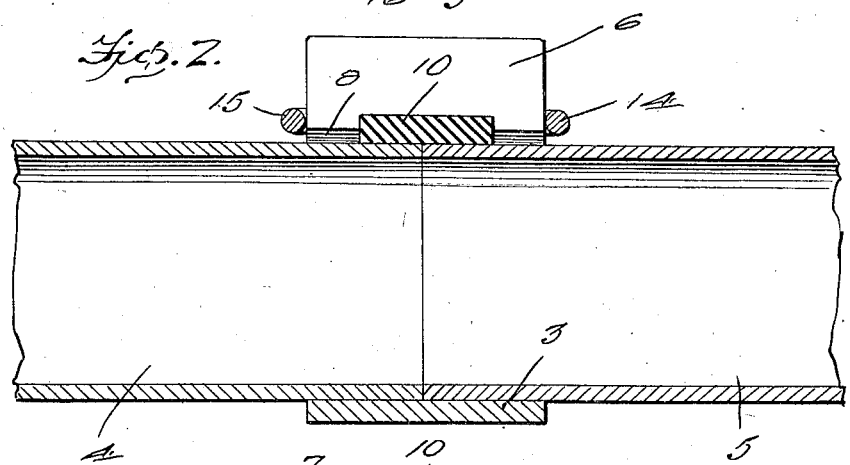
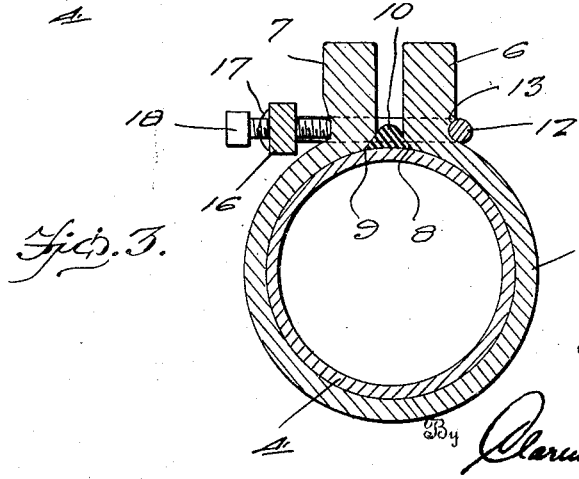
Inventor
A. I. Hansen
By Clarence A. O'Brien
Attorney Patented July 27, 1926.

1,594,258

UNITED STATES PATENT OFFICE.

ARTHUR INGEMANN HANSEN, OF ROSELAND, LOUISIANA.

PIPE COUPLING.

Application filed August 18, 1925. Serial No. 51,020.

This invention relates to improvements in pipe couplings for connecting the abutting ends of a pair of aligned pipe sections together.

One of the important objects of the present invention is to provide a pipe coupling which is of such construction as to enable the same to be readily and easily attached or detached, whereby considerable time and labor will be saved.

A further object is to provide a pipe coupling of the above mentioned character which includes a means for securing the packing element over a portion of the abutting ends of the pair of aligned pipe sections, so that the coupling will be leakproof.

A further object is to provide a pipe coupling of the above mentioned character which is simple in construction, inexpensive, strong, and durable, and further well adapted to the purpose for which it is designed.

Other objects and advantages of the invention will become apparent during the course of the following description taken in connection with the accompanying drawing.

In the accompanying drawing forming a part of this application and in which like numerals designate like parts throughout the same:

Figure 1 is a top plan view of my improved coupling showing the same attached to the abutting ends of a pair of aligned pipe sections.

Figure 2 is a sectional view taken on line 2—2 of Figure 1, and

Figure 3 is a transverse section taken on line 3—3 of Figure 1.

In the drawing, wherein for the purpose of illustration is shown the preferred embodiment of my invention, the numeral 1 designates generally my improved coupling, the same comprising a split band 3 which is formed of any suitable metallic material, the band being adapted to encircle the abutting ends of a pair of aligned pipe sections 4 and 5 respectively, in the manner clearly illustrated in the drawing. The free ends of the split band 3 are disposed outwardly to provide a pair of cooperating flanges 6 and 7 respectively. These outwardly disposed flanges are disposed preferably in parallel spaced relation with respect to each other and are thicker than the width of the major portion of the band.

The inner opposed faces of these outwardly extending flanges have their inner longitudinal edges beveled as indicated at 8 and 9 respectively for cooperation with the beveled faces of the packing members 10, which are formed preferably of rubber, and is substantially triangular in cross section. This rubber packing provides a filler between the split portions of the band and extends across the abutting ends of the pipe sections 4 and 5 so that the coupling will prevent any possibility of a leakage occurring.

For the purpose of securing the coupling in position on the abutting ends of the pipe sections, there is provided the substantially U-shaped clamp as designated generally by the numeral 11. The crown portion 12 thereof extends longitudinally across the outer face of the flange 6, and a suitable groove 13 is provided in the outer face of the inner portion of the flange to accommodate the crown portion. The arms 14 and 15 respectively extend transversely across the respective ends of the flanges, and the free ends of the arms project beyond the outer face of the other flange 7. A bar 16 bridges the outer free ends of the arms of the U-shaped clamp 11, the free ends of these arms being upset as indicated at 17, for preventing the accidental displacement of the bar from the clamp.

This cross bar 16 is provided with suitable threaded openings through which extend the set screws 18, the inner ends of which engage the outer face of the flange 7, and it is obvious that when the set screws are turned in one direction, the coacting flanges 6 and 7 will be drawn together, and at the same time compressing the packing member 10, so that the coupling will be rigidly secured on the abutting ends of the aligned pipe sections 4 and 5, against accidental displacement therefrom. Manifestly, by turning the set screws in the other direction, the U-shaped clamp may be disengaged from the flanges and the split band removed as well as facilitating the removal of the rubber packing member 10.

A pipe coupling of the above mentioned character may not only be used in connection with the abutting end sections of a pair of aligned water pipes, but may also be used in electrical conduits wherein the wires are arranged in the conduits, and whenever it becomes necessary to repair the wires, the coupling may be readily disengaged from the pipe sections, and access to the interior thereof may then be easily had.

A pipe coupling of the above character will save considerable time and labor, and will obviate the necessity of having to thread the abutting ends of the pipe sections as well as form flanges thereon such as are now ordinarily done for connecting the ends of the pair of pipe sections together by any coupling.

While I have shown the preferred embodiment of the invention it is to be understood that minor changes in the size, shape and arrangement of parts may be resorted to without departing from the spirit of the invention and the scope of the appended claim.

Having thus described the invention, what I claim as new is:—

A pipe coupling comprising a split band adapted to encircle the abutting ends of a pair of aligned pipe sections, the free ends thereof being bent outwardly to provide a pair of parallel spaced flanges, the inner faces of the flanges being beveled along the inner edges thereof, a substantially triangular shaped compressible packing member disposed between the beveled faces of the flanges and engaging the abutting end sections of the pipes, a substantially U-shaped clamp, the crown portion thereof extending across the outer face of one of the flanges, the arms of the U-shaped clamp extending transversely across the free ends of the respective ends of the flanges, a cross bar bridging the free ends of said arms, and set screws threaded through the cross bar and engaging the outer face of the other flange for clamping the compressible packing member between the free end portions of the split band and holding the latter on said pipe sections.

In testimony whereof I affix my signature.

ARTHUR INGEMANN HANSEN.